(12) United States Patent
Shariat et al.

(10) Patent No.: US 11,799,765 B2
(45) Date of Patent: Oct. 24, 2023

(54) FAILURE MODES IN MULTI-HOP NETWORKS

(71) Applicant: SAMSUNG ELECTRONICS CO., LTD., Suwon-si (KR)

(72) Inventors: Mehrdad Shariat, Staines (GB); Milos Tesanovic, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/049,248

(22) Filed: Oct. 24, 2022

(65) Prior Publication Data

US 2023/0075709 A1 Mar. 9, 2023

Related U.S. Application Data

(63) Continuation of application No. 17/054,147, filed as application No. PCT/KR2019/005633 on May 10, 2019, now Pat. No. 11,483,233.

(30) Foreign Application Priority Data

May 10, 2018 (GB) .................................... 1807602

(51) Int. Cl.
*H04L 45/28* (2022.01)
*H04L 41/0654* (2022.01)
(Continued)

(52) U.S. Cl.
CPC .......... *H04L 45/28* (2013.01); *H04L 41/0654* (2013.01); *H04L 45/22* (2013.01);
(Continued)

(58) Field of Classification Search
None
See application file for complete search history.

(56) References Cited

U.S. PATENT DOCUMENTS

| 5,941,955 | A | 8/1999 | Wilby et al. |
| 6,862,263 | B1 | 3/2005 | Simmons |

(Continued)

FOREIGN PATENT DOCUMENTS

| EP | 1531634 A1 | 5/2005 |
| EP | 2837132 B1 | 4/2016 |

OTHER PUBLICATIONS

Supplementary European Search Report dated May 26, 2021, in connection with a counterpart European Patent Application No. 19799160.7, 17 pages.

(Continued)

*Primary Examiner* — Anh Ngoc M Nguyen

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is a method of fault recovery in a multi-hop network having a plurality of nodes, defining a route, comprising the steps of: determining that a fault exists between two of the plurality of nodes (B, C); performing a hierarchical fault recovery process.

10 Claims, 5 Drawing Sheets

(51) Int. Cl.
*H04L 45/00* (2022.01)
*H04L 45/302* (2022.01)
*H04L 45/44* (2022.01)
*H04L 69/40* (2022.01)
*H04W 24/04* (2009.01)
*H04W 40/12* (2009.01)

(52) U.S. Cl.
CPC ............ *H04L 45/302* (2013.01); *H04L 45/44* (2013.01); *H04L 69/40* (2013.01); *H04W 24/04* (2013.01); *H04W 40/12* (2013.01)

(56) References Cited

U.S. PATENT DOCUMENTS

| | | |
|---|---|---|
| 6,862,690 B1 | 3/2005 | Bezera et al. |
| 2002/0174207 A1 | 11/2002 | Battou |
| 2005/0105462 A1 | 5/2005 | Belotti et al. |
| 2014/0351396 A1 | 11/2014 | Stabile et al. |
| 2015/0215200 A1 | 7/2015 | Bottari et al. |
| 2016/0212706 A1 | 7/2016 | Kahtava et al. |
| 2017/0006499 A1* | 1/2017 | Hampel ............... H04L 45/04 |
| 2019/0223002 A1 | 7/2019 | Novlan et al. |
| 2019/0327660 A1* | 10/2019 | Hong ............... H04W 40/38 |
| 2019/0349079 A1* | 11/2019 | Novlan ............. H04B 7/15542 |
| 2020/0100212 A1 | 3/2020 | Lee et al. |

OTHER PUBLICATIONS

ZTE, "Consideration on Topology Management for IAB", 3GPP TSG RAN WG3 Meeting #99-Bis, R3-181830, Sanya, China, Apr. 16-20, 2018, 4 pages.

AT T, "Discussion on IAB node discovery and topology/route management", 3GPP TSG-RAN WG3 #99bis, R3-182299, Sanya, China, Apr. 16-20, 2018, 6 pages.

Huawei, "Overview on IAB", 3GPP TSG-RAN WG3#99bis, R2-181998, Sanya, China, Apr. 16-20, 2018, 9 pages.

Li et al., "Local Route Recovery Algorithms for Improving Multihop TCP Performance in Ad Hoc Wireless Networks", European Conference on Parallel Processing, 2004, 8 pages.

Combined Search and Examination Report under Sections 17 and 18(3) dated Oct. 25, 2018 in connection with United Kingdom Patent Application No. GB1807602.6, 7 pages.

International Search Report dated Aug. 14, 2019 in connection with International Patent Application No. PCT/KR2019/005633, 3 pages.

Written Opinion of the International Searching Authority dated Aug. 14, 2019 in connection with International Patent Application No. PCT/KR2019/005633, 5 pages.

European Patent Office, "Communication pursuant to Article 94(3) EPC," dated Dec. 20, 2022, in connection with European Patent Application No. 19799160.7, 12 pages.

Ericsson, "Architecture for integrated access and backhaul," 3GPP TSG-RAN WG2 NR AH1801, Vancouver, Canada, Jan. 22-26, 2018, R2-1801022, 9 pages.

* cited by examiner

FAILURE MODES IN MULTI-HOP NETWORKS

CROSS-REFERENCE TO RELATED APPLICATIONS

This application is a continuation of application Ser. No. 17/054,147, now U.S. Pat. No. 11,483,233 issued Oct. 25, 2022, which is a 371 of International Application No. PCT/KR2019/005633 filed on May 10, 2019, which claims priority to United Kingdom Patent Application No. 1807602.6 filed on May 10, 2018, the disclosures of which are herein incorporated by reference in their entirety.

BACKGROUND

1. Field

The present disclosure relates to a multi-hop network. The present disclosure specifically relates to a multi-hop network in a telecommunication system. More particularly still, the present disclosure relates to improvement of failure recovery in an Integrated Access and Backhaul (IAB) system in a telecommunication network as used in Fifth Generation (5G) or New Radio (NR) systems.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Several architecture reference models have been proposed in the prior art for LAB, making use of a Central Unit/Distributed Unit (CU/DU) split architecture. To enable hop-by-hop forwarding between IAB-nodes, an adaptation layer has been proposed, to be introduced in the User Plane (UP) of IAB nodes (both donor and relay) that includes routing and bearer mapping information across the hops. Current proposals state that the current UP adaptation layer is complemented by a Control Plane (CP) counterpart module deciding on bearer mapping/path management via updating the mapping table inside the UP adaptation layer headers. The control signaling can alternatively be sent using UP, i.e., using a Data Radio Bearer (DRB).

Problems exist in managing communication failures between nodes and it is desirable to be able to recover from individual node failures speedily and without adversely affecting other nodes in the system or significantly increasing signaling overhead across the system.

SUMMARY

Embodiments of the present invention address issues with failure of nodes in a multi-hop network.

According to the present invention there is provided an apparatus and method as set forth in the appended claims. Other features of the invention will be apparent from the dependent claims, and the description which follows.

According to an aspect of the present invention, there is provided a method of fault recovery in a multi-hop network having a plurality of nodes, defining a route, comprising the steps of: determining that a fault exists between two of the plurality of nodes (B, C); performing a hierarchical fault recovery process. An embodiment of the invention essentially attempts to resolve the problem by using the nodes which were in use immediately before the fault occurred. If that is not possible, then one or more additional nodes are brought in to play incrementally to rebuild the route by bypassing the faulty link. This is what is meant by hierarchical in this context.

In an embodiment, fault recovery comprises finding an alternative path or performing a different bearer mapping on one or more existing paths.

In an embodiment, the hierarchical fault recovery process comprises the step of attempting to recover from the fault using only the nodes active in the route at the time the fault was determined.

In an embodiment, the hierarchical fault recovery process comprises the step of routing data via an adjacent node (E) which is capable of communication with the two nodes (B, C) between which there is a fault. This step and the preceding one may be performed in either order, as required. It may be preferable to attempt the previous step first, before attempting to recruit an adjacent node, but this can be implemented as required by the network designer or operator, In an embodiment, the hierarchical fault recovery process comprises the step of routing data via an additional non-adjacent node (F) from the adjacent node (E) to second node (C) of the two nodes (B, C) between which there is a fault.

In an embodiment, the hierarchical fault recovery process comprises the step of performing an end-to-end route re-computation so to bypass a link between the two nodes (B, C) between which there is a fault.

In an embodiment, the multi-hop network is an Integrated Access and Backhaul, IAB, network in a telecommunication network.

In an embodiment, a fast bearer reconfiguration is triggered, based on one or more of the following criteria:
A1 if a projected or estimated change in link quality is below a certain threshold;
A2 if a QoS of UE bearers as previously communicated by a CU can be maintained;
A3 if a loss in QoS of UE bearers as communicated by a CU can be kept within a pre-determined limit;
A4 if a new number of backhaul bearers can be kept below a defined threshold;
A5 if a new set of DRBs has similar properties to a previous set of DRBs; or
A6 if a signaling overhead change is within an agreed limit.

In an embodiment, the adjacent node (E) is selected on the basis of one or more of the following criteria:
B1 a requirement to form inter-node DRBs to satisfy QoS requirements for UE bearers as shared by CU;
B2 a projected change in latency, determined based on the new number of hops and/or past information on the latency of individual hops;
B3 loading of the adjacent node (E) as indicated by feedback from neighbouring nodes.

In an embodiment, the end-to-end route re-computation is performed by a CU (A).

In an embodiment, a CU (A) caches preferred alternative routes in one or more DUs (B, G), together with conditions that need to be met for these to be used without triggering messages towards the CU (A).

In an embodiment, QoS information provided by the CU (A) includes an expiry time stamp after which time a route re-computation message towards the CU (A) is required.

In an embodiment, the hierarchical fault recovery process comprises the progressive addition, as required, of additional nodes, so as to complete the route.

In an embodiment, a first stage involves the addition of zero additional nodes, with additional stages adding nodes as required, up to a final stage where a complete end-to-end route re-computation is performed.

In an embodiment, a network comprising a plurality of nodes, is provided whereby the network is operable to perform the method of any one of the preceding claims.

In general, the steps in the hierarchical process can be performed in any order and can be initiated from any one of the steps. The order presented herein is exemplary only and present a logical means of escalation, but it is by no means intended to be limiting.

The hop-by-hop forwarding between adjacent IAB-nodes as set out above relies on the NR Uu interface. In embodiments of the present invention, triggers are defined which engage/initiate path management.

These include one or more of:
changes to the bearer mapping information (e.g., based on changes in channel condition between IAB nodes);
changes in topologies (new nodes/connections being established);
changes in network loading/congestion level.

The extent, physical location, and periodicity of above changes can have different impacts on stability of routing/bearer mapping information across the network and these are all taken into account in embodiments of the invention.

Since path management—a CP function—is centralized, if a decision is made to change a path, even by a small amount, in the prior art a fully updated mapping table would normally be sent to the entire set of DUs, including the donor DU. However, based on Quality of Service (QoS) information already shared with the DUs and via applying triggers as per embodiments of the invention, the DUs are able to locally change the UE bearer to IAB bearer mapping, resulting in faster mapping change without the involvement of the CU.

Embodiments of the invention demonstrate how allowing path management in the DU of different IAB nodes enables addresses the various changes in the environment mentioned above with a smaller impact on route change latency, while devising operation of faster mapping change, with or without CU involvement. The triggers defined in embodiments of the invention help to achieve this.

More specifically, embodiments of the invention relate to a hierarchical failure assessment, notification and signaling between counterpart CP-adaptation layers to dynamically decide on the extent of bearer mapping change or route update that is needed and then implement such change or update, as required.

Typically, the CU will decide on the mapping between UE DRBs and inter-IAB node DRBs for the entire path to the IAB node to which the UE in question attaches. The CU will provide to the DU the mapping tables and QoS parameters. Embodiments of the invention relate to methods of determining when the fast bearer reconfiguration can be triggered and how fast bearer reconfiguration is implemented.

BRIEF DESCRIPTION OF THE DRAWINGS

Although a few preferred embodiments of the present invention have been shown and described, it will be appreciated by those skilled in the art that various changes and modifications might be made without departing from the scope of the invention, as defined in the appended claims.

For a better understanding of the invention, and to show how embodiments of the same may be carried into effect, reference will now be made, by way of example only, to the accompanying diagrammatic drawings in which.

DETAILED DESCRIPTION

Embodiments of the invention provide a hierarchical management approach to the full or partial failure of an inter-node link. This approach ensures that more minor issues can be dealt with as locally as possible, with a staged escalation up to an including a complete re-computation of the route, only if no previous alternative succeeds in re-establishing the full route. The different stages in this hierarchical approach are illustrated schematically in FIGS. 1 to 4 which illustrate different approaches to dealing with an outage between two nodes in the multi-hop network.

One variant of the invention applies when a partial link failure is noted between one source IAB node and another sink IAB node. If the projected/estimated change in link quality is below a certain threshold (e.g. as measured by channel quality feedback from the sink to the source); and/or if the QoS of the UE bearers as previously communicated by the CU can be maintained; and/or if the loss in the QoS of the UE bearers as communicated by the CU can be kept within a pre-determined limit; and/or if the new number of backhaul bearers can be kept below a certain threshold; and/or if the new set of DRBs has "similar" properties to the old set of DRBs (one similarity metric could be delay and throughput requirements; a refinement would be that this similarity would only need to apply to certain QoS-sensitive traffic and not best-effort traffic); and/or if the signaling overhead change is within an agreed limit, a fast bearer reconfiguration is triggered between the sink/source nodes simply impacting bearer mapping between the two. In a refinement of this embodiment, the fast bearer reconfiguration is triggered based on type of traffic carried by UE bearers—e.g., if the traffic is latency critical.

In FIGS. 1 to 4, there is illustrated a typical multi-hop network topology as used in IAB. Node A is a Central Unit (CU). The CU is the controller for two Distributed Units (DU)—nodes B and G. Nodes C, D, E, F and H are IAB nodes. The intention in each of the Figures is for data traffic to flow from node A to node D via whichever nodes are configured.

Figure 1:
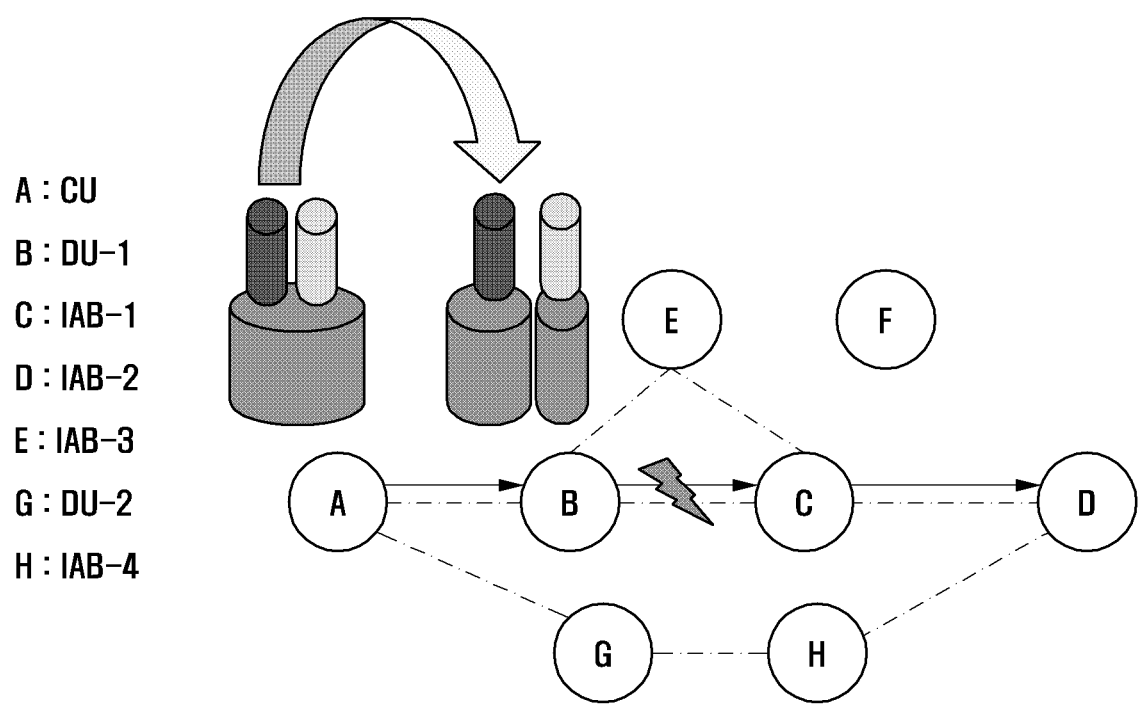
FIG. 1 shows a network schematic illustrating a partial link failure between two nodes, according to an embodiment of the invention.

FIG. 1 illustrates the scenario where there is a partial link failure noted between one source IAB node (B) and another sink IAB node (C). In this scenario, there are originally four active nodes involved in the communication: A, B, C, and D. The other nodes shown—E, F, G and H—may be carrying other data traffic, but they are not herein referred to as active nodes, since they do not form a part of the multi-hop network of interest.

In this case, a fast bearer reconfiguration is triggered between the sink/source nodes, which simply impacts bearer mapping between the two nodes with no wider network implications. In a further embodiment, the fast bearer reconfiguration is triggered based on the type of traffic carried by the UE bearers—e.g., if the traffic is latency critical.

In order to trigger the fast bearer reconfiguration, one or more of the following may be detected:

A1 if the projected or estimated change in link quality is below a certain threshold (e.g., as measured by channel quality feedback from the sink to the source);
A2 if the QoS of the UE bearers as previously communicated by the CU can be maintained;
A3 if the loss in the QoS of the UE bearers as communicated by the CU can be kept within a pre-determined limit;
A4 if the new number of backhaul bearers can be kept below a certain threshold;
A5 if the new set of DRBs has "similar" properties to the old set of DRBs. One similarity metric relates to delay and throughput requirements, and a refinement of this is that this similarity requirement only applies to certain QoS-sensitive traffic and not best-effort traffic;
A6 if the signaling overhead change is within an agreed limit.

Figure 2:
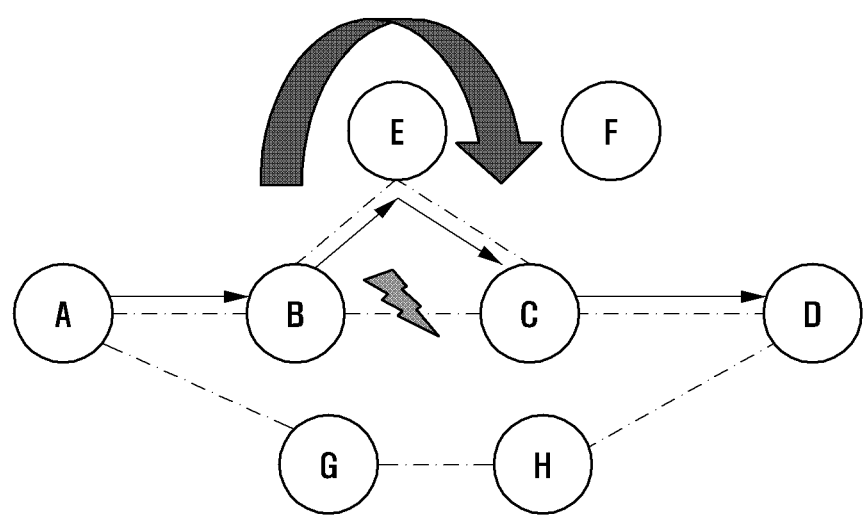
FIG. 2 shows a network schematic illustrating a full link failure between two nodes, according to an embodiment of the invention.

FIG. 2 illustrates the scenario where there is a full link failure (outage) between one source IAB (B) node and another (C) and a fast local recovery message is triggered from the source node (B) to (at least) one adjacent node (E) to establish connectivity between source and sink nodes. The choice of the "new" intermediate node (E) can be determined according to an embodiment of the invention by one or more of:

B1 the requirement to form inter-node DRBs to satisfy the QoS requirements for UE bearers as shared by CU;
B2 the projected change in latency, which can be determined using the new number of hops and/or past information on the latency of individual hops;
B3 loading of the new node as indicated by feedback from neighbouring nodes.

Therefore, this approach simply impacts local bearer mapping between the nodes adjacent to the source. In a refinement of this embodiment, the throughput & delay trade-offs incurred by various commonly expected topology and link quality changes may be computed off-line and cached locally so that the source node can then use them as a look-up table when determining whether to trigger a fast local recovery.

In FIG. 2, the active nodes are A, B, E, C and D.

In a further refinement, there is envisaged a scenario where fast local recovery is applied to only a subset of incoming DRBs, while for other DRBs (such as those where some or all of the requirements listed above cannot be met), an end-to-end route re-computation message is triggered towards the CU. See the following related to FIG. 4 for further details.

Figure 3:
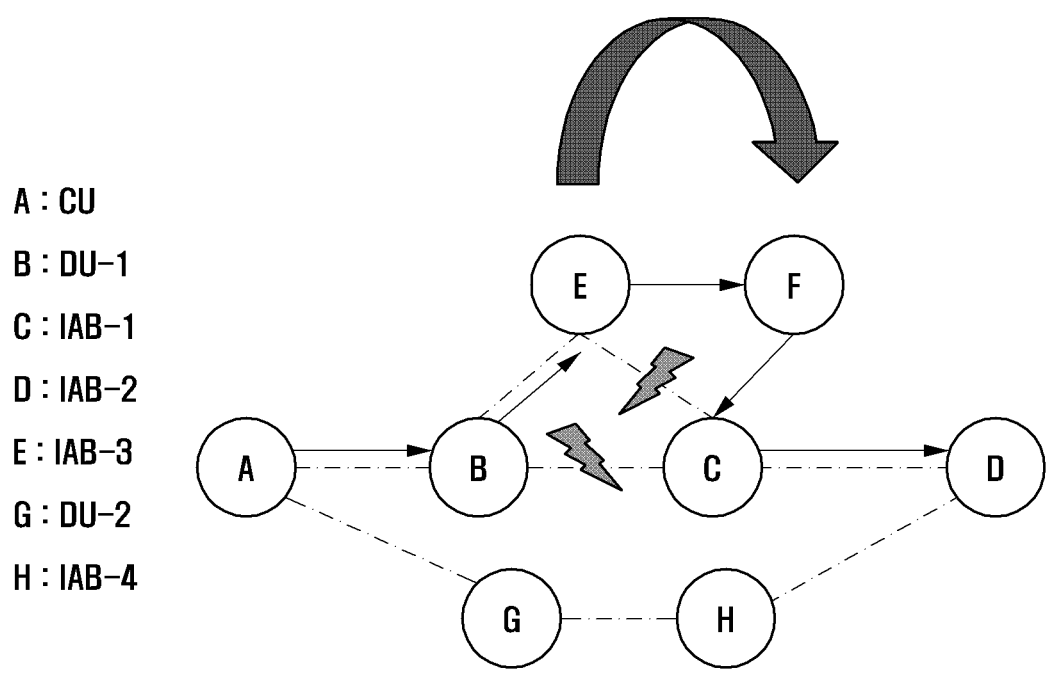
FIG. 3 shows a network schematic illustrating a partial path recovery, according to an embodiment of the invention.

FIG. 3 illustrates the scenario where, if the failure between nodes B and C cannot be locally remedied (e.g. because the conditions listed above in connection with FIG. 2 cannot be met), a partial path recovery message is triggered, impacting the bearer mapping between both nodes adjacent to the source (B) and at least one non-adjacent node (F) to establish a path between source and sink nodes. As can be seen here, the path is recovered by means of node E and F, where node E is not able to form a link to node C directly, whereas node E can form a link to node F, and node F can form a link to node C. As such, traffic originally intended to travel directly from node B to node C now follows the path node B to node E to node F to node C.

This approach requires the use of a non-adjacent node and introduces a further hop delay since there is now an additional node involved compared to the scenario illustrated in FIG. 2.

In FIG. 3, the active nodes are A, B, E, F, C and D.

Figure 4:
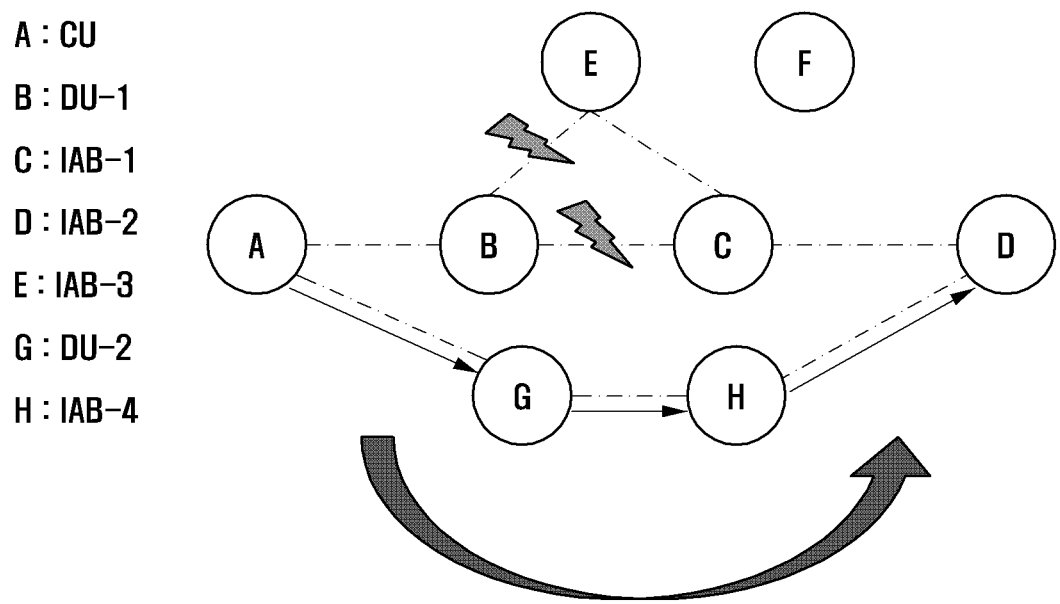
FIG. 4 shows a network schematic illustrating an end-to-end route re-computation and recovery, according to an embodiment of the invention.

FIG. 4 illustrates the scenario where, if the failure cannot be resolved by a partial path recovery, as illustrated in FIG. 3, an end-to-end route re-computation message is triggered towards the CU, or wherever the route/path management controller resides. This impacts at least all the nodes on the route. Typically, in the prior art, this was the only or the preferred option and the CU would typically provide the DU with the relevant mapping tables and QoS parameters to form the route. The end-to-end route re-computation is performed so that the faulty link (the link between B and C in this example) is excluded from the computation. The nodes B and C, between which the faulty link exists, are not necessarily excluded if they can be used to construct a route by avoiding the faulty link.

In FIG. 4, the active nodes are A, G, H and D.

In a refinement of this embodiment, the CU can cache various preferred alternatives in the DU and conditions that need to be met for these to be used without triggering messages towards the CU. This provides network elements with some autonomy and can reduce signaling overhead.

In a further embodiment, QoS information shared by the CU (A) can have an expiry timestamp, after which the route re-computation message towards the CU (A) has to be triggered.

Figure 5:
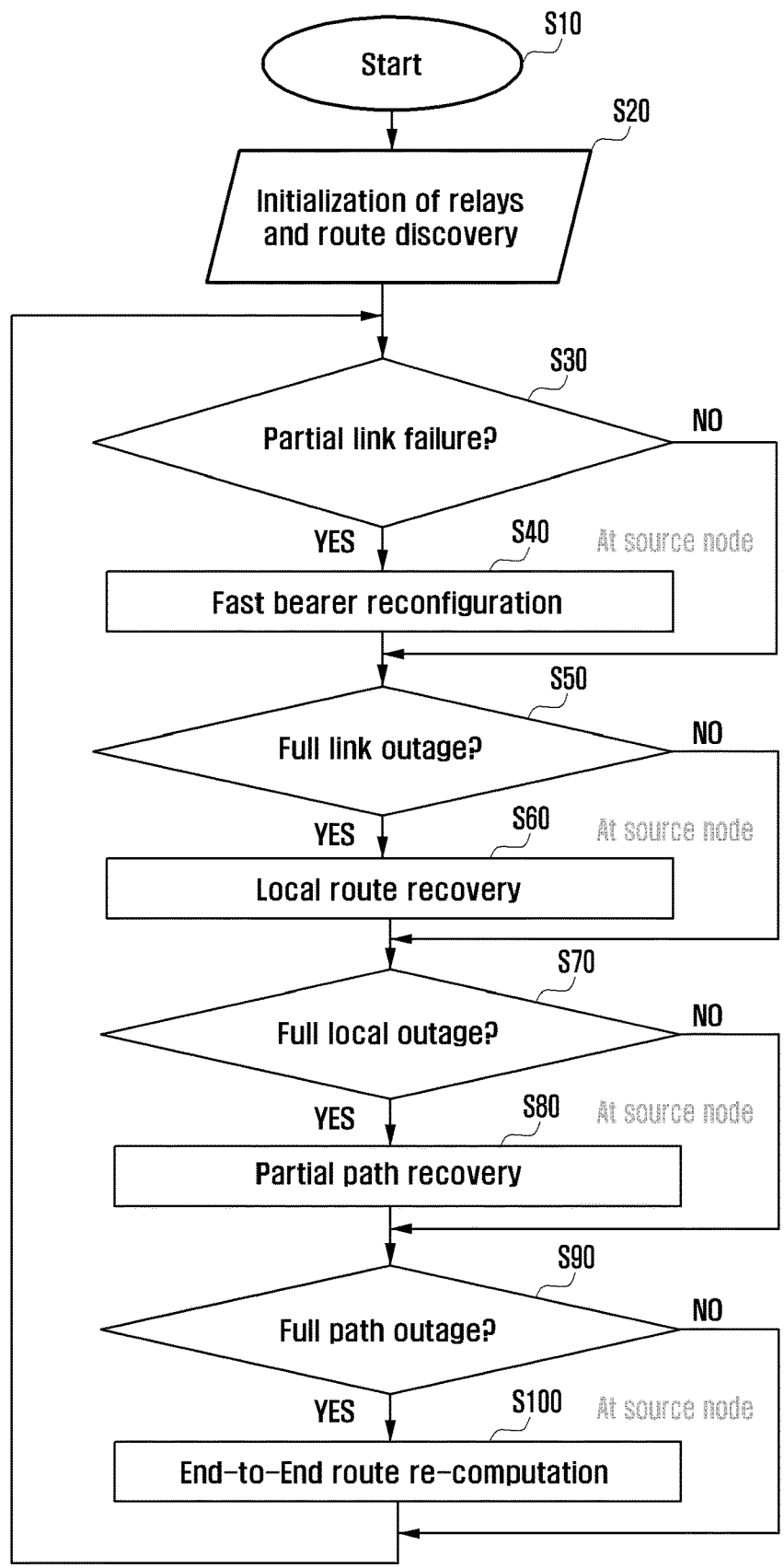
FIG. 5 shows a flowchart illustrating a method according to an embodiment of the invention.

FIG. 5 is a flowchart which illustrates a method according to an embodiment of the invention and clearly illustrate the hierarchical nature of embodiments of the invention.

The process starts at S10 and at S20 relay nodes and the route discovery process are initialized in a known manner.

At S30, a check is made to determine if a partial link failure has occurred (as shown in FIG. 1). This can be detected if any one of triggers A1 to A6, previously defined, are detected.

If one of these triggers is detected, then a fast bearer reconfiguration is initiated at step S40 and data traffic continues to flow from node B to C, albeit with possibly different data throughput rates, for instance.

At step S50, a check is made to determine if a full link outage has occurred between nodes B and C (as shown in FIG. 2). If so, this triggers a fast local recovery message from the source node (B) to (at least) one adjacent node (E). In this case, local route recovery is initiated at step S60 by including an adjacent node (E) in the multi-hop network such that the adjacent node is interposed between nodes B and C.

At step S70, a check is made to determine if there is a full local outage (as shown in FIG. 3). This is triggered by a partial path recovery message in the reply from adjacent node (E) to the source node (B), expressing that the non-adjacent node (F) is the only possible path towards nodes C and then D. This impacts the bearer mapping between both nodes adjacent to the source (B) and at least one non-adjacent node (F) to establish a path between source and sink nodes.

In this case, partial path recovery is initiated at step S80, whereby a non-adjacent node (F) is introduced such that data traffic flows from node B to node E to node F and on to node C. This introduces an additional node over and above that introduced in the previous step.

At step S90, a check is made to determine if there has been a full path outage. This is initiated based on a notification from node B to node A due to finding that all paths towards node D (i.e., either via C or E) in outage At step S100, a full end-to-end re-computation is performed at node A, as CU, to avoid the problematic nodes identified. In this case, data traffic is re-routed via nodes G and H so that traffic flows from A to D.

A feature of embodiments of the invention is that an attempt is made to solve any issues locally as far as possible. Only if that is not possible are neighbouring nodes used, then non-adjacent nodes and finally a complete re-computation of the route. This has the effect of minimizing signaling and ensuring a speedy resolution.

In this description, the term 'route' is used to refer to the interconnections between the source and sink. In particular, route refers to e.g. A-B-C-D in FIG. 1, to A-B-E-C-D in FIG. 2, to A-B-E-F-C-D in FIG. 3 and to A-G-H-D in FIG. 4. Thus, the source and sink are identical in each case, but the route differs, depending upon which nodes are in use.

The term 'path' is used to refer to a subset of the route and typically refers to local re-routing so that the route may be preserved as far as possible, without needing to perform a full end-to-end route re-computation (as in FIG. 4).

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method performed by a first integrated access and backhaul (IAB) node in a communication system, the method comprising:
receiving, from a central unit (CU), configuration information including information on at least one path for data routing;
identifying a first link for data routing based on the configuration information;
identifying whether a link failure is detected; and
in case that the link failure is detected, selecting a second link for data routing based on the configuration information.

2. The method of claim 1,
wherein a second TAB node associated with the first link and a third TAB node associated with the second link are a next hop of the first TAB node, and
wherein the configuration information includes a first mapping between the second TAB node and a first path for data routing to a destination, and a second mapping between the third TAB node and a second path for data routing to the destination.

3. The method of claim 1, further comprising:
transmitting data via the second link.

4. The method of claim 1, further comprising:
selecting a bearer corresponding to the second link,
wherein at least one channel is configured for the selected bearer based on a quality of service (QoS) requirement.

5. The method of claim 2, wherein an indication indicating the link failure is triggered by the second IAB node.

6. The method of claim 1, wherein the link failure is detected, based on one or more of:
A1 if a projected or estimated change in link quality is below a threshold;
A2 if a quality of service (QoS) of a bearer as previously communicated by the CU can be maintained;
A3 if a loss in QoS of the bearer as communicated by the CU is kept within a pre-determined limit;
A4 if a new number of backhaul bearer is kept below a defined threshold;
A5 if a new set of a data radio bearer (DRB) has similar properties to a previous set of a DRB; or
A6 if a signaling overhead change is within an agreed limit.

7. A first integrated access and backhaul (IAB) node in a communication system, the first IAB node comprising:
an interface configured to transmit and receive signals between a distributed unit (DU) of the first IAB node and a central unit (CU); and
a controller coupled to the interface and configured to control an adaptation layer of a user plane (UP) to:
receive, from the CU via the interface, configuration information including information on at least one path for data routing,
identify a first link for data routing based on the configuration information,
identify whether a link failure is detected, and
in case that the link failure is detected, select a second link for data routing based on the configuration information.

8. The first IAB node of claim 7,
wherein a second TAB node associated with the first link and a third TAB node associated with the second link are a next hop of the first TAB node, and
wherein the configuration information includes a first mapping between the second IAB node and a first path for data routing to a destination, and a second mapping between the third IAB node and a second path for data routing to the destination the second IAB node is associated with a first path for routing the data to the destination.

9. The first IAB node of claim 8,
wherein the controller is further configured to select a bearer corresponding to the second link, and transmit data via the selected bearer, and
wherein at least one channel is configured for the selected bearer based on a quality of service (QoS) requirement.

10. The first IAB node of claim 8, wherein an indication indicating the link failure is triggered by the second IAB node.

* * * * *